Dec. 15, 1953 W. H. NEWMASTER 2,662,786
WHEEL AND SHAFT MOUNTING FOR VEHICLES
Filed Dec. 23, 1949 2 Sheets-Sheet 1
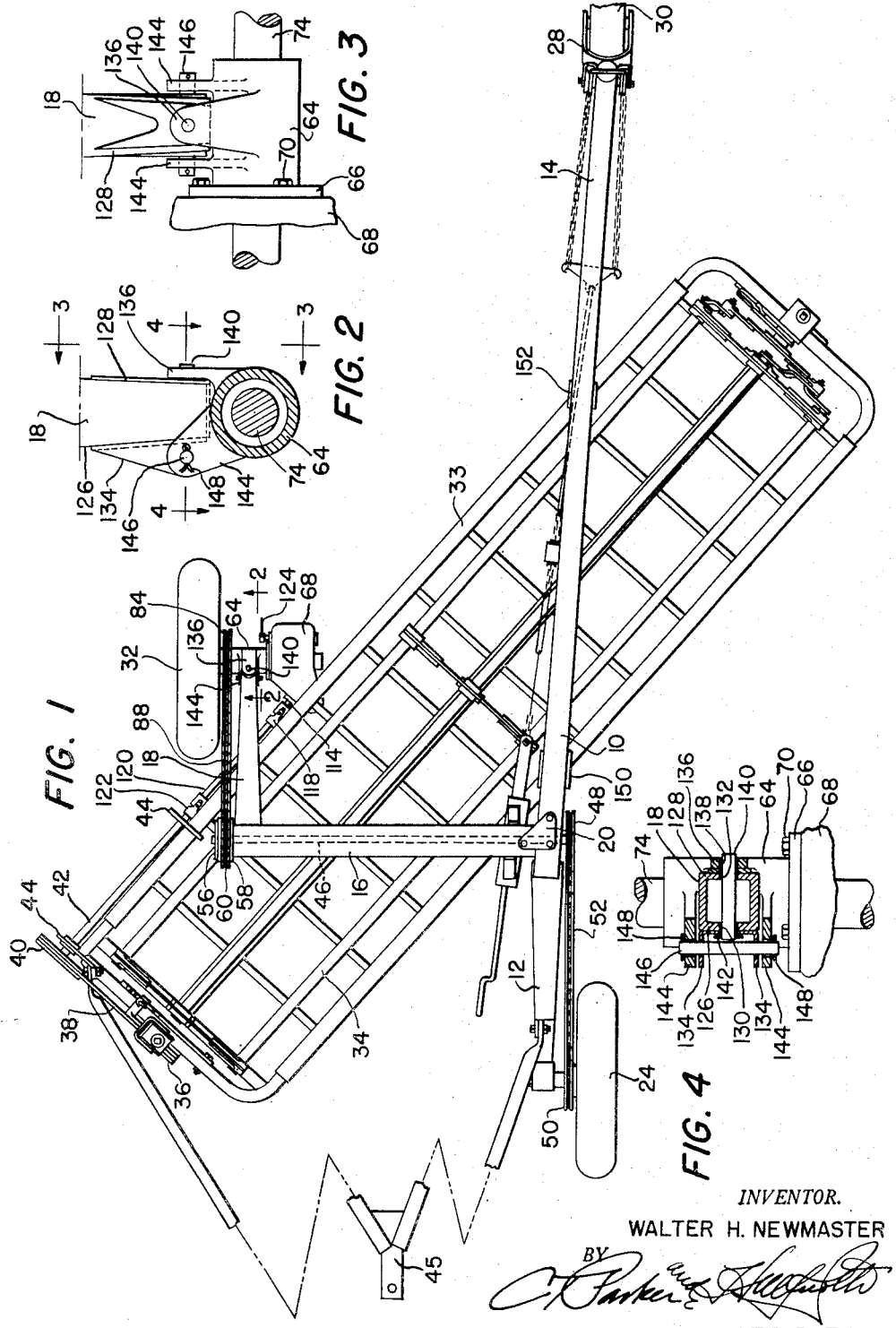
INVENTOR.
WALTER H. NEWMASTER
ATTORNEYS Dec. 15, 1953   W. H. NEWMASTER   2,662,786
WHEEL AND SHAFT MOUNTING FOR VEHICLES
Filed Dec. 23, 1949   2 Sheets-Sheet 2
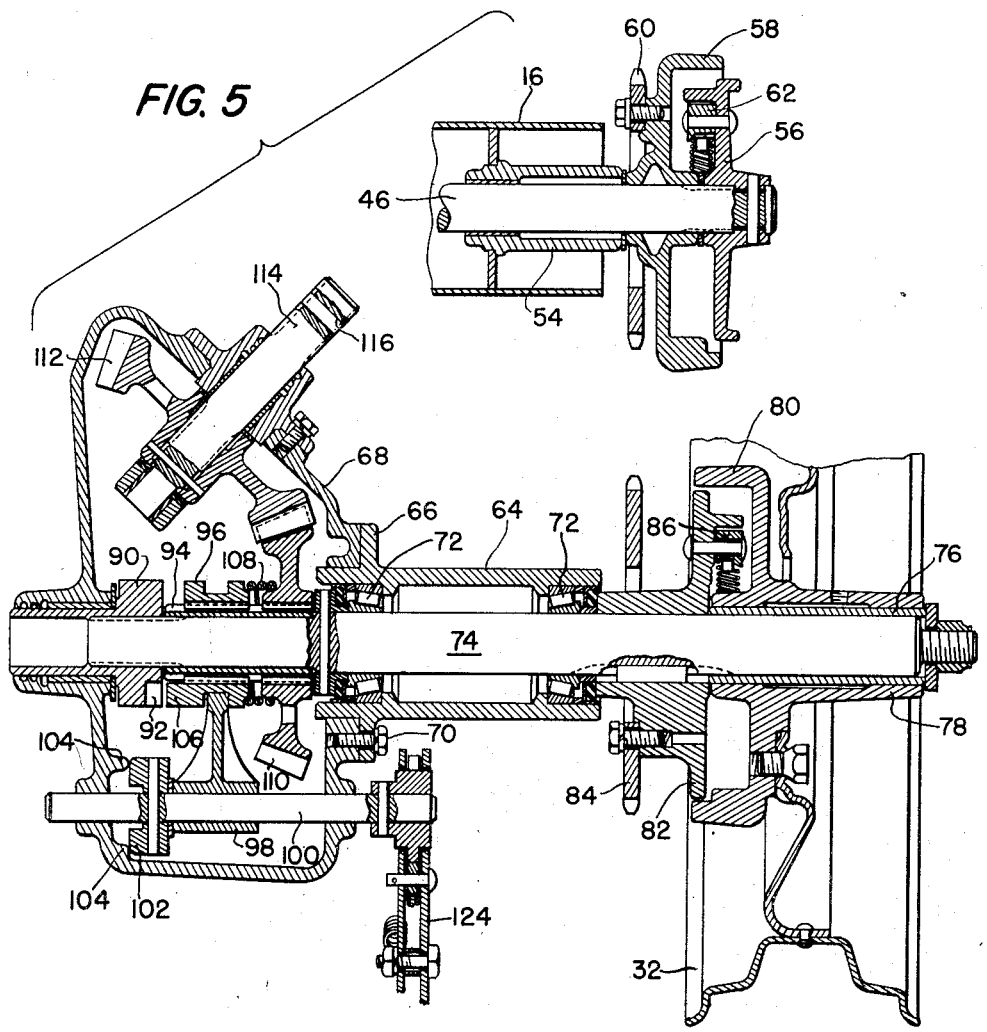
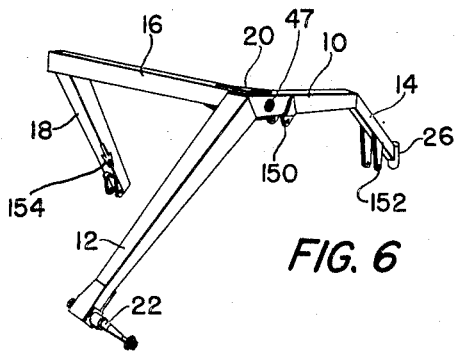
INVENTOR.
WALTER H. NEWMASTER
ATTORNEYS Patented Dec. 15, 1953

2,662,786

UNITED STATES PATENT OFFICE 2,662,786

WHEEL AND SHAFT MOUNTING FOR VEHICLES

Walter H. Newmaster, Ottumwa, Iowa, assignor to Deere Manufacturing Co., Dubuque, Iowa, a corporation of Iowa Application December 23, 1949, Serial No. 134,709

3 Claims. (Cl. 287—20)

1

This invention relates to a wheel or shaft mounting for vehicles and more particularly to an improved unit mounting for a wheel and gear casing adapted primarily for use in a side delivery rake.

The usual side delivery rake comprises a longitudinal main frame carried on two or more wheels and having a rotatable raking element such as a reel disposed diagonally across the main frame. The drive means for the reel ordinarily include power-transmitting connections between the reel and the wheels. Because of the diagonal disposition of the reel with respect to the main frame, the rake is rather cumbersome to ship in assembled form and ordinarily is therefore disassembled. It has been found in the past that the requirements for reassembling the rake render such reassembly difficult in the absence of special instructions and tools. It is therefore desirable to break down the assembly of the rake into certain units that may be readily assembled and disassembled, which units or components are just as easily crated or packaged for shipment.

Further objects of the invention reside in improved means for the removable mounting of the carrier unit on a generally downwardly extending support of the main frame, this means including a pair of connecting pins that are loaded in shear rather than in tension or compression and thus furnish a relatively inexpensive and simple mounting that has high loadbearing characteristics. A further object of the invention resides in the arrangement of the mounting pins in such manner that one serves as means to prevent displacement of the other. A still further object of the invention resides in the provision on the carrier unit of supporting means in the form of ears that embrace or overlie parts of the rake frame support so as to further add to the rigidity of the assembled structure.

The foregoing and other important objects and desirable features inherent in and encompassed by the invention will become apparent as a complete disclosure thereof is made in the following detailed description and accompanying sheets of drawings, in which Figure 1 is a general plan view of one form of rake to which the invention may be applied;

Figure 2 is an enlarged fragmentary sectional view taken on the line 2—2 of Figure 1 and showing the carrier mounting;

2

Figure 3 is a rear end view as seen along the line 3—3 in Figure 2;

Figure 4 is a transverse sectional view as seen from above along the line 4—4 of Figure 2;

Figure 5 is an enlarged and compacted sectional view showing the drive means and the relationship thereto of the wheel and shaft mounting; and Figure 6 is a view of the rake frame per se to illustrate the characteristics thereof when removed from its component parts such as wheels and rake reel.

General rake structure

The longitudinal main frame of the rake is made up of a generally longitudinally extending beam 10 having at its forward end a forwardly and downwardly inclining leg 12 and at its rear end a rearwardly and downwardly inclining leg 14 (Figure 6). The beam 10 has rigidly fixed thereto a transverse beam 16, the outer or righthand end of which has rigidly fixed thereto a generally downwardly and rearwardly inclined leg 18. The rake frame and its components are preferably of fabricated tubular construction welded together at all points except at a removable connection 20 between the transverse beam 16 and the longitudinal beam 10.

As best seen in Figure 6, the front leg 12 is provided at its lower or forward end with a transverse spindle 22 on which is journaled a supporting or ground-engaging wheel 24. The rear or lower end of the leg 14 carries a vertical bearing 26 in which is journaled the yoke and standard 28 of a rear castering wheel 30. The lower end of the right-hand leg 18 is provided with means for the mounting thereon of a third supporting or ground-engaging wheel 32. The details of this mounting will be brought out below.

The main frame carries a reel frame 33 which is disposed diagonally to the line of travel, as is generally conventional. The extreme righthand corner of the rake frame projects transversely or outwardly beyond the right-hand leg or support 18. The reel frame carries a rotatable rake element in the form of a reel 34 which has fixed to its right-hand end an input member in the form of a sheave 36. Drive means, here in the form of an endless belt 38, is trained about the sheave 36 and about a second sheave 40 fixed on the outer end of an input shaft 42 journaled in bearing brackets 44 on the rear frame member of the reel frame.

The rake is adapted to be drawn behind a tractor or other propelling source by means of draft structure indicated generally by the numeral 45.

The transverse beam 16 is preferably hollow and serves as means to journal a transverse shaft 46, the left-hand end of which projects through the proximate portion of the longitudinal beam 10, being journaled at this end in a bearing 47 (Fig. 6). A sprocket 48 is keyed to the projecting end of the shaft 46 and is in longitudinal alinement with a sprocket 50 fixed to and coaxial with the front wheel 24. A driving chain 52 interconnects the sprockets 50 and 48. The right-hand end of the shaft 46 is proximate to the upper end of the right-hand support or leg 18 and is journaled in the transverse beam 16 by means of a bearing 54 (Fig. 5).

This end of the shaft 46 is provided with drive means in the form of an overrunning clutch having a constantly driven member 56 keyed to the shaft and an intermittently driven member 58 journaled on the shaft adjacent the constantly rotating member. The member 58 has fixed thereto a sprocket 60, for purposes to presently appear. The two members 56 and 58 are connectible at times by means of one or more spring-loaded pawls, one of which appears at 62 in Figure 5. The construction in this respect may vary and since that shown follows fairly well what is conventional, except for those details forming the subject matter of U. S. Patent 2,583,383, no further details thereof have been illustrated or will be described.

Wheel and shaft mounting

The wheel and shaft mounting for the wheel 32 comprises a carrier unit made up of a shaft carrier 64 providing a journal or bearing on an axis transverse to the direction of travel of the rake. This carrier is disposed adjacent the lower or rear end of the right-hand leg or support 18 and is preferably a tubular casting having adjacent its inner end an annular flange 66 to which is removably secured a gear casing or housing 68. The means for accomplishing the separable connection between the flange 66 and casing or housing 68 comprise a plurality of cap screws 70. The carrier 64 is of sufficient axial length to project beyond both the inner and outer sides of the lower end of the support 18 and is provided internally with a pair of axially spaced anti-friction bearings 72 which serve to journal an elongated mounting or wheel shaft 74.

The shaft 74 has an outer end portion projecting outwardly beyond the outer side of the support or leg 18 and is provided with a bearing or bushing 76 for journaling a hub 78 of the wheel 32. A second drive means in the form of an overrunning clutch is associated with the wheel 32 and comprises a constantly driven member 80, preferably formed as part of the wheel hub 78, and an intermittently driven member 82 keyed to the shaft 74 between the inner face of the wheel 32 and the proximate end of the carrier 64. This member 82 has secured thereto a sprocket 84 which is in longitudinal alinement with the sprocket 60 of the first overrunning clutch described above. The members 80 and 82 are interconnected at times for rotation together by means of one or more spring-loaded pawls, one of which is shown at 86 in Figure 5. A driving chain 88 interconnects the sprockets 60 and 84.

It will be seen from the description thus far that the shaft 74 will be driven from both wheels 24 and 32 during straight-ahead travel of the rake. However, on a right-hand turn, the wheel 24 will travel considerably faster than the wheel 32. The spring-loaded pawls 86 will thus allow the member 82 to overrun the member 80, since the member 80 is, through the sprockets 60 and 84 and chain 88, deriving power from the shaft 46 which is in turn being relatively rapidly driven by the left-hand front wheel 24. On left-hand turns, the shaft 74 will be driven by the more rapidly rotating wheel 32 and the pawls 62 in the overrunning clutch 56—58 will allow the member 56 to overrun the member 58. In this respect, the function of the driving means is generally conventional.

The inner end of the shaft 74 is contained in the gear casing 68 and from this end of the shaft power is taken to drive the reel 34. As best seen in Figure 5, the shaft 74 within the gear casing 68 has keyed thereto an axially fixed clutch element 90 having one or more clutch teeth as at 92. A splined sleeve 94 loosely encircles the shaft 74 and carries for rotation therewith but for axial shifting thereon a movable clutch element 96 under control of a shipper 98 fixed to a control rod 100 journaled at its opposite ends in parallel walls of the casing 68. The shaft 100 is rockable about its axis and has fixed thereto a cam member 102 which is normally held in the position indicated in Figure 5 by means of a pair of high spots 104 on the interior of the proximate wall of the casing. The shiftable or movable clutch element 96 has one or more teeth as at 106 which, when the parts are in the position shown in Figure 5, are disengaged from the teeth 92 of the clutch element 90. When the shaft 100 is rotated, the cam member 102 thereon moves off of the high spots 104 and the shipper and shaft are biased to the left by means of a coil spring 108 which bears at one end against the clutch element 96 and at its other end against the hub of a bevel gear 110. The teeth 106 and 92 become engaged and the bevel gear 110 is driven by the clutch element 96 through the intermediary of the splined sleeve 94 to which the gear is likewise splined.

The bevel gear 110 is in constant mesh with a bevel gear 112 keyed to a forwardly and outwardly extending shaft 114 journaled in a front wall portion of the casing 68. The axis of rotation of the shaft 114 is at an angle to the axis of the shaft 74. The shaft 114 is constantly driven as long as the rake is moving forwardly, unless disconnected by clutch means to be presently described.

The relationship of the shaft 114 to the remainder of the rake can be seen in Figure 1. The outer or projecting end of the shaft 114 has a bore 116 therethrough which serves as means for conection of the shaft to a universal joint 118 at one end of a coupling shaft 120. The other end of the shaft 120 is connected by a universal joint 122 to the proximate end of the reel input shaft 42.

The control shaft 100 is provided at its one end outside the casing 68 with a control arm 124, to which may be connected a rope or other means for remote operation, as by the operator of the tractor that is drawing the rake.

From the description thus far it will be seen that the carrier unit comprising the carrier 64, casing 68, shaft 74, and wheel 32 comprises, in addition to means for supporting the right-hand side of the rake, a pair of drive members, one of which is to the left or inwardly of the support or leg 18 and the other of which is to the right or outwardly of the support. This arrangement forms the subject matter of copending divisional application, Serial No. 282,614, filed April 16, 1952.

The lower end of the support or leg 18 has front and rear wall elements or faces 126 and 128, respectively, which are formed as part of the tubular rectangular section of the support (Figure 4). These wall elements are provided respectively with openings 130 and 132 which are alined on a longitudinal axis to provide a bore through the lower end of the support. The forward or front wall element or face 126 has a pair of transversely spaced apart parallel ears 134. These ears lie preferably respectively in the planes of the inner and outer sides or faces of the support (Figure 4). The ears are apertured on a transverse axis which is, of course, normal to the axis of the alined apertures 130 and 132. As best seen in Figures 2 and 3, the axes of the bores or apertures lie in intersecting planes.

The carrier 64 is provided with a first mounting means in the form of an ear 136 preferably integrally cast with the carrier and adapted to overlie the rear wall element 128 of the support 18. The ear 136 is apertured at 138 and a connecting member in the form of a pin 140 is passed through the alined apertures or openings 130, 132 and 138. The rear end of the pin projects slightly beyond the rear face of the ear 136 and the forward end of the pin projects beyond the front wall element 126 of the support and at this point is provided with retaining means in the form of a cotter pin 142 which prevents axial displacement of the pin 140 rearwardly.

The carrier 64 is provided with a pair of transversely spaced apart ears 144, preferably cast integral with the carrier, which are adapted respectively to overlie the outer faces of the ear portions 134 provided on the front wall element of the support. The ears 144 are apertured in alinement and are alineable with the apertures in the ears 134, and a connecting member in the form of a second pin 146 is passed through these alined apertures and across the forward projecting end of the first connecting pin 140. The pin 146 has means for preventing axial displacement thereof, this means preferably taking the form of a pair of cotter pins 148.

As best seen in Figure 4, the pin 146 passes across the forward end of the pin 140 and thus blocks the pin 140 against escape forwardly. The pin 146 thus has or constitutes means for preventing axial displacement of the pin 140 at least in a forward direction.

Figure 2 shows that the ears 144 respectively overlie portions of the inner and outer faces of the support 18, thus contributing further to the rigidity of the mounting means. Further, the load applied to both pins 140 and 146 is in shear, rather than in tension or compression. Hence, the mounting is relatively inexpensive and its load-bearing characteristics are considerably higher than more expensive constructions not utilizing the factors just outlined.

*Summary*

As previously stated, the importance of the invention lies in its contribution to the ease with which the rake in general may be assembled, disassembled and reassembled. As shown in Figure 6, the rake frame itself may be stripped of its components and the frame and its components may be separately packaged and crated and shipped together in a much smaller unit than would be otherwise possible. The rake frame is provided with three hangers 150, 152 and 154 for removably supporting the rake frame 33. The front wheel 24 and the caster wheel 30 are easily removed from the rake frame. Likewise, the entire carrier mounting comprising the wheel 32, shaft 14, carrier 64 and casing 68 is readily removable from the support or leg 18, it being necessary merely to remove the two pins 140 and 146 after disconnecting the drive chain 88. As a matter of fact, because of the connecting pins 140 and 146, removal of the pins will permit separation of the carrier unit from the remainder of the rake without requiring separation of links in the chain 88, since the entire unit may be moved forwardly and outwardly and the chain 88 passed over the casing 68.

Other advantages and features of the invention not specifically enumerated above will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. A shaft mounting, comprising: a support of generally rectangular section having front and rear parallel faces and opposite side faces normal to said front and rear faces, said support having a bore therethrough, said bore opening at its opposite ends respectively to the front and rear faces; a shaft carrier having a portion parallel to and overlying the rear face of the support and having an aperture in alinement with the bore in the support; a connecting pin passed through the aperture and bore and having an end projecting at the front face of the support; a pair of spaced ears on the support and lying respectively in planes paralleling the opposite sides of the support and projecting forwardly beyond the projecting end of the pin, said ears respectively having apertures alined on an axis normal to and substantially intersecting the axis of the bore ahead of the projecting end of the pin; a pair of spaced parallel ears on the carrier respectively alongside the support ears and respectively having apertures in alinement with the apertures in the support ears; a second connecting pin passed through the four ear apertures and extending across and in blocking relationship to the projecting end of the first connecting pin; and means retaining the second pin against displacement along its own axis.

2. A shaft mounting, comprising: a support having first and second faces related to each other at right angles and further having a first opening through the first face on an axis parallel to the second face and a second opening through the second face on an axis parallel to the first face and substantially intersecting the axis of the first opening; a shaft carrier having first and second apertured portions related to each other at right angles and cooperative respectively with the first and second faces of the support and with the openings therein; a first connecting member passed through the first opening and the first apertured portion; means retaining the connecting member against displacement along its own axis; and a second connecting member passed through the second opening and the second apertured portion and engaging the first connecting member to be held by said first connecting member against displacement along its own axis in at least one direction.

3. A shaft mounting, comprising: a support having openings therethrough respectively on axes normal to each other; a shaft carrier having a pair of portions related to each other at right angles and respectively having through apertures therein on axes normal to each other for respective alinement with the support openings; a first connecting pin passed through one opening and through the aperture alined therewith; a second connecting pin passed through the other opening and the aperture alined therewith; and means on one of said pins engaging the other pin for retaining one of the pins against axial displacement.

WALTER H. NEWMASTER.

References Cited in the file of this patent

UNITED STATES PATENTS

| Number | Name | Date |
|---|---|---|
| 622,603 | Bushnell | Apr. 4, 1899 |
| 789,790 | Bigsby | May 16, 1905 |
| 1,085,691 | Lavers | Feb. 3, 1914 |
| 1,404,260 | Arnold | Jan. 24, 1922 |
| 1,535,419 | Harfos | Apr. 28, 1925 |
| 1,746,968 | Ross | Feb. 11, 1930 |
| 2,002,179 | Hitchcock | May 21, 1935 |
| 2,040,692 | Hitchcock | May 12, 1936 |
| 2,252,379 | Johns | Aug. 12, 1941 |
| 2,303,309 | McArthur | Nov. 24, 1942 |

FOREIGN PATENTS

| Number | Country | Date |
|---|---|---|
| 11,134 | Great Britain | June 6, 1895 |